Figure 1:
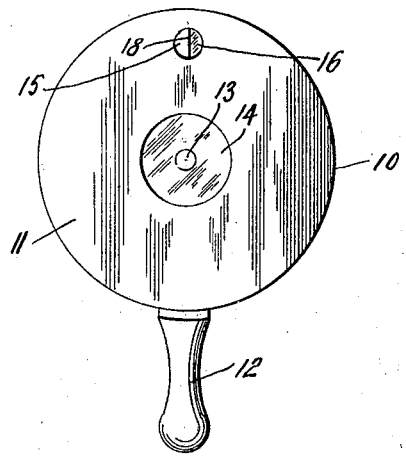

Nov. 11, 1924.  1,515,305

E. T. HARTINGER

EYE TESTING APPARATUS

Filed Jan. 28 1921

Patented Nov. 11, 1924.

1,515,305

UNITED STATES PATENT OFFICE.

EDWARD T. HARTINGER, OF NEW YORK, N. Y.

EYE-TESTING APPARATUS.

Application filed January 28, 1921. Serial No. 440,666.

*To all whom it may concern:*

Be it known that I, EDWARD T. HARTINGER, a citizen of the United States, and resident of the city of New York, in the county of New York and State of New York, have invented certain new and useful Improvements in Eye-Testing Apparatuses, of which the following is a specification.

The present invention relates to attachments to eye-testing devices, and more particularly to a distance measuring apparatus.

In examining the eyes of a patient with a retinoscope, ophthalmoscope or other device, the oculist positions his eyes at a predetermined distance from that of the patient, usually at a distance of one meter for convenience in calculation. In order to obtain a proper reading with the oculist's instrument, the said distance should, obviously, remain fixed throughout the examination. Considerable difficulty is experienced, however, because of the fact that both the patient and oculist are apt to move in relation to one another and because of the fact that the eye testing devices, as at present used, do not indicate, during the examination, a change in the distance between the observing eye and the eye to be tested.

The main object of the present invention is to provide a distance measuring apparatus that is mounted upon the eye-testing device and co-operates with a scale upon the trial frame on the head of the patient, for aiding in positioning the oculist's eye at a desired distance in relation to the patient's eye and for indicating any change in the relative positions of the observing eye and the eye to be observed.

Another object of the invention is to produce a distance measuring device of the type mentioned which is simple in construction, efficient in operation and capable of manufacture on a commercial scale, or in other words one which is not so difficult to produce as to be beyond the reasonable cost of such a contrivance.

A further object of the invention is to provide a distance measuring device of the character specified which is capable of being mounted upon the eye-testing device without interfering in any way with the proper operations of the latter.

With these and other objects in view, which will more fully appear as the nature of the invention is better understood, the same consists in the combination, arrangement and construction of parts hereinafter described, pointed out in the appended claim and illustrated in the accompanying drawings, it being understood that many changes may be made in the size and proportion of the several parts and details of construction within the scope of the appended claim, without departing from the spirit or sacrificing any of the advantages of the invention.

One of the many possible embodiments of the invention is illustrated in the accompanying drawings, in which:—

Figure 2:
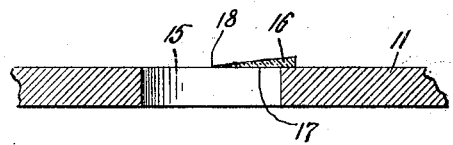
Figure 3:
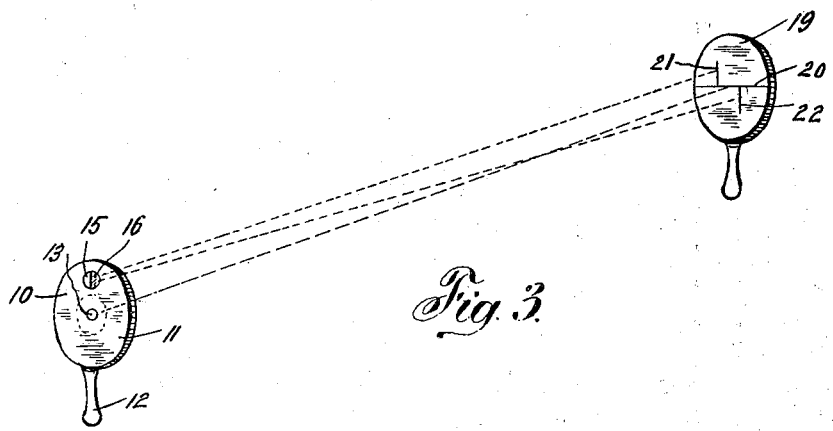

Figure 1 is a front elevation of a distance measuring device constructed in accordance with the present invention; Fig. 2 is a section taken on line 2—2 of Fig. 1, on a larger scale; and Fig. 3 illustrates diagrammatically the use of the device.

In the drawings, the distance measuring apparatus is illustrated as employed upon a retinoscope, but it is obvious that it may be used in connection with other eye-testing devices just as well, without departing from the invention, which lies mainly in the provision of a distance measuring device, to be used as an integral part of, or in connection with or as attachment to an instrument for eye testing, the main feature being that the apparatus is fixed in relation to said instrument, so as to move therewith, when in operation.

In the drawings, the numeral 10 indicates a retinoscope, which may be of any suitable configuration and construction, it comprising, in the case illustrated, a disk 11, carried by a handle 12, and provided with a central observation aperture 13. That surface of the disk which faces, in operation, the eye to be tested, is provided with a reflecting mirror 14, for the well known purpose. The operation of the elements thus far mentioned is well known and need not be described in detail herein as they do not form part of the present invention.

The disk 11 is furthermore provided with a small aperture 15 of any suitable configuration. In the case illustrated in the drawings a circular aperture is shown, and behind this aperture is mounted upon the disk a transparent prism 16, more particularly a triangular geometrical prism, one of its refracting faces, denoted by the numeral 17, abutting against the said disk and its apex 18, preferably, bisecting the aperture 15, that is to say extending diametrically across the same. This apex is disposed vertically, for a purpose hereinafter to be described. The prism may be directly attached to the disk 11, as shown in the drawings, or it may be mounted upon a transparent medium having parallel faces in planes parallel to the plane of the disk 11. The refractive power of this prism is one dioptric. It is well known in optics that a straight line viewed, through a prism of one dioptric refractive power, from a distance of one meter is displaced or shifted in parallel relation to itself a distance of one centimeter. In the use of the instrument herein described, this well known law of physics is relied upon.

The operation of the apparatus is as follows: A disk 19 is mounted upon the trial frame, usually employed by oculists, said frame being mounted upon the patient's head in the well known manner. On the disk 19 is provided a horizontal line 20, extending diametrically across said disk, and at right angles to the said first-mentioned lines are provided upon the said disk two vertical lines 21 and 22, spaced apart one centimeter, one of said vertical lines being disposed above the horizontal line and the other one below the same. The disk 19 covers one of the eyes of the patient, while the other is to be examined. The oculist, in examining the uncovered eye, by the aid of the retinoscope above described, views the disk 19 through the aperture 15, shifting his position in relation to the patient until the refracted rays of light through the prism 16 cause one of the vertical lines on the disk 19 to register with and form a continuation of the other. When this occurs, the observer's eye is located from the patient's eye exactly one meter, for the reasons above stated. Should the distance between the eye to be observed and that of the observer vary while the observation takes place, this fact will immediately come to the attention of the observer, as the two vertical lines on the disk 19 are out of register as soon as the distance between the two eyes changes.

It is obvious that, while herein a prism of specific refractive power has been described, others may just as well be used without departing from the invention. With the change of the prism, obviously, the distance between the vertical lines 21 and 22 upon the disk 19 must be varied accordingly.

What I claim is:—

A distance measuring apparatus including a target having marked thereon a horizontal line and two vertical lines spaced apart and disposed one above said horizontal line and the other one below the same, a disk shiftable in relation to said target provided with an aperture, and a transparent triangular geometrical prism fixed to said disk and having its apex bisecting vertically said aperture, whereby the image of one of said two vertical lines, simultaneously viewed, may be obtained by direct rays passing through the uncovered portion of said aperture and the image of the other by rays passing through and refracted by said prism, for the purpose set forth.

Signed at New York, in the county of New York and State of New York, this 21st day of December, A. D. 1920.

EDWARD T. HARTINGER.